US006977488B1

(12) United States Patent
Nogawa et al.

(10) Patent No.: US 6,977,488 B1
(45) Date of Patent: Dec. 20, 2005

(54) DC-DC CONVERTER

(75) Inventors: Masashi Nogawa, Tama (JP); Tetsuo Tateishi, Warwick, RI (US)

(73) Assignee: Texas Instruments Incorporated, Dallas, TX (US)

( * ) Notice: Subject to any disclaimer, the term of this patent is extended or adjusted under 35 U.S.C. 154(b) by 119 days.

(21) Appl. No.: 10/653,778

(22) Filed: Sep. 2, 2003

(30) Foreign Application Priority Data

Sep. 27, 2002 (JP) ............................ 2002-283437

(51) Int. Cl.$^{7}$ ................................................ G05F 1/59
(52) U.S. Cl. ...................... 323/271; 323/222; 323/225; 323/285; 323/299
(58) Field of Search ............................... 323/222, 225, 323/266, 271, 282, 285, 299

(56) References Cited

U.S. PATENT DOCUMENTS

| | | | | | |
|---|---|---|---|---|---|
| 4,814,685 | A * | 3/1989 | Renger | ........................ | 323/224 |
| 5,734,258 | A * | 3/1998 | Esser | ........................ | 323/224 |
| 6,166,527 | A * | 12/2000 | Dwelley et al. | ............ | 323/222 |
| 6,191,567 | B1 * | 2/2001 | Sluijs | ........................ | 323/259 |
| 6,215,286 | B1 * | 4/2001 | Scoones et al. | ............ | 323/222 |
| 6,275,016 | B1 * | 8/2001 | Ivanov | ........................ | 323/224 |
| 6,320,358 | B2 * | 11/2001 | Miller | ........................ | 323/222 |
| 6,348,779 | B1 * | 2/2002 | Sluijs | ........................ | 323/222 |
| 6,636,431 | B2 * | 10/2003 | Seki et al. | .................... | 363/65 |
| 6,737,838 | B2 * | 5/2004 | Sluijs et al. | ................ | 323/225 |
| 6,765,371 | B2 * | 7/2004 | Kataoka | ..................... | 323/222 |
| 6,788,033 | B2 * | 9/2004 | Vinciarelli | .................. | 323/225 |
| 2001/0004205 | A1 * | 6/2001 | Miller | ........................ | 323/224 |

* cited by examiner

*Primary Examiner*—Jeffrey Sterrett
(74) *Attorney, Agent, or Firm*—W. Daniel Swayze, Jr.; W. James Brady; Frederick J. Telecky, Jr.

(57) ABSTRACT

A DC—DC converter can supply a stable output voltage from an input voltage with the power supply voltage varying along with the supply of the power and can maintain a high voltage conversion efficiency. The DC—DC converter includes an inductive element and the first-fourth switches connected to both terminals of the inductive element, the first and second switches are turned on and off periodically corresponding to the input voltage. When the input voltage goes below a prescribed reference level, a first control signal that keeps the first switch constantly on is generated by a feedforward control circuit to turn on the third and fourth switches periodically corresponding to the output voltage so that the output time of the third switch is generated by a feedback control circuit to switch the voltage increasing operation and the voltage increasing/decreasing operation corresponding to the input voltage.

12 Claims, 5 Drawing Sheets

FIG. 6
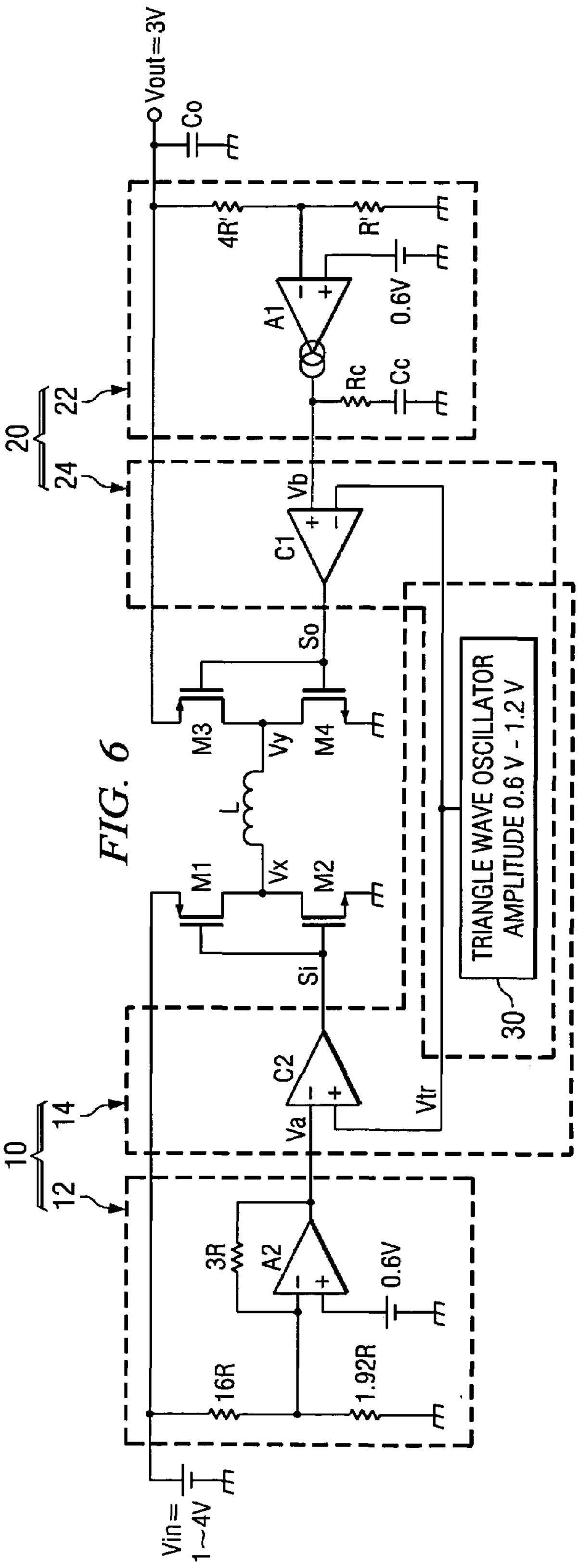
FIG. 7
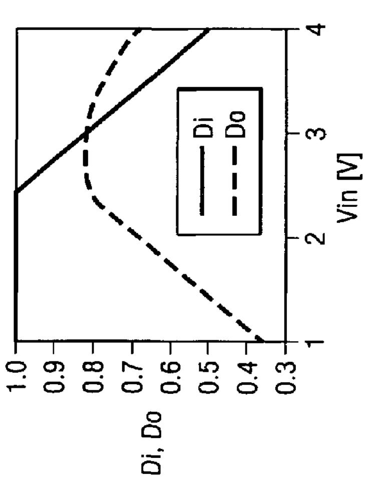
FIG. 8a
FIG. 8b
FIG. 8c
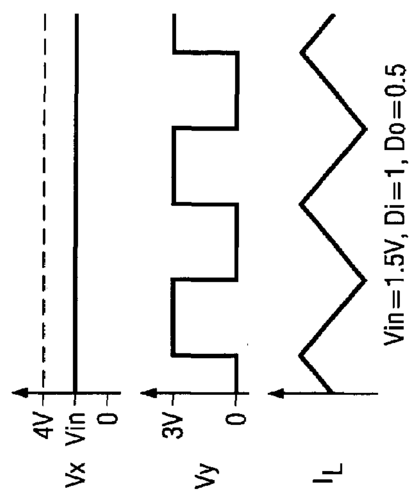

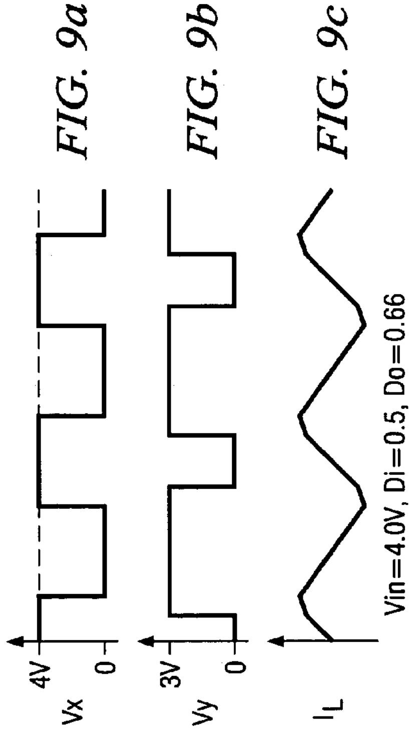
FIG. 9a
FIG. 9b
FIG. 9c
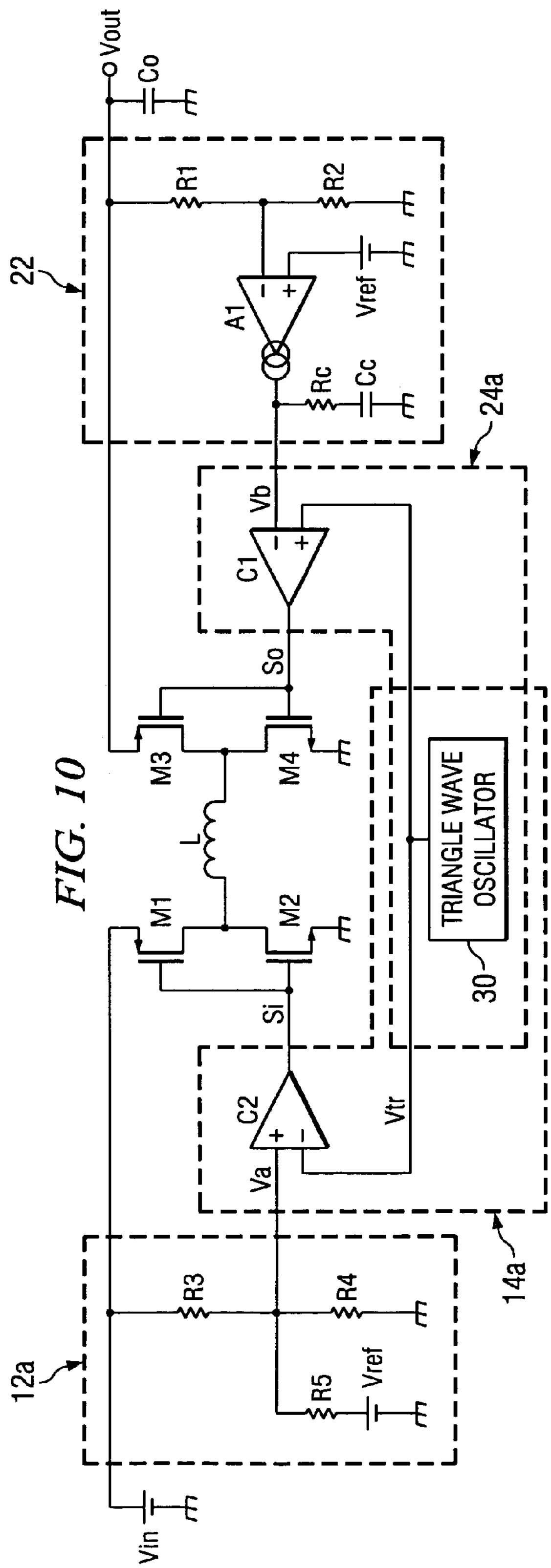
FIG. 10

DC-DC CONVERTER

FIELD OF THE INVENTION

The present invention pertains to a DC—DC converter that can supply the desired DC voltage from the power supply voltage.

BACKGROUND OF THE INVENTION

Switching regulators are DC—DC converters that supply a certain voltage independent of changes in the input voltage and can be categorized as the step-up type, which outputs a voltage higher than the input voltage; the step-down type, which outputs a voltage below the input voltage; and the step-up/step-down type. The so-called H-bridge type is also generally known as the voltage step-up/step-down type of switching regulator.

An H-bridge type switching regulator includes an inductive element used for storing magnetic energy, a switching element for controlling the current supply to the inductive element from the power supply voltage, and another switching element for controlling the current output from the inductive element to the load. By controlling the timing for turning each switching element on and off, the amount of magnetic energy stored in the inductive element and the amount of the electrical amount energy output to the load can be suitably controlled. Therefore, the desired DC voltage can be supplied to the load. An example of which are found in the specification of U.S. Pat. No. 6,087,816 and the specification of U.S. Pat. No. 6,215,286.

However, in a conventional voltage increase/decrease DC—DC converter made from the H-bridge type switching regulator, since the timing for storing and the timing for releasing magnetic energy in the inductive element are completely separate, a large current flows through the inductive element. As a result, the power loss caused by the switching element, inductive element, and other low-resistance components becomes high, and the voltage conversion efficiency is low.

SUMMARY OF THE INVENTION

In order to improve the voltage conversion efficiency of the DC—DC converter, a system that divides the voltage increase/decrease operation is proposed. In other words, the operation of the switching regulator is divided into the operation that stores energy in the inductive element from the power supply voltage, and the operation that outputs the magnetic energy stored in the inductive element as current to the load. When the voltage increase/decrease operation is divided into two operating modes for voltage increase and voltage decrease, the input side or output side is connected at a 100% duty ratio. Therefore, the current through the inductive element becomes small, and the efficiency can be improved.

For portable electronic devices driven by batteries, such as laptop computers, cellular phones, etc., lower power consumption is important for extending the service life of the battery. Further efficiency improvement is required for the DC—DC converter used for supplying stable driving voltage to these electronic devices.

The purpose of the present invention is to provide a DC—DC converter that can supply a stable output voltage from the input voltage when the power source voltage varies and that can maintain a high voltage conversion efficiency.

In order to realize the purpose, the present invention provides a DC—DC converter comprising the following: an inductive element with one terminal connected to a voltage input terminal via a first switching element and connected to a reference potential via a second switching element and with the other terminal connected to a voltage output terminal via a third switching element and connected to the reference potential via a fourth switching element; a feedforward control circuit, which outputs a first control signal used for turning on and off the first and second switching elements periodically corresponding to the input voltage applied to the voltage input terminal and outputs the first control signal that keeps the first switching element in the on state and the second switching element in the off state when the input voltage drops below a predetermined reference value; and a feedback control circuit, which outputs a second control signal used for turning on and off the third and fourth switching elements periodically corresponding to the voltage output from the voltage output terminal and outputs the second control signal that controls the ratio of the on time of the third switching element so that the output voltage is kept at a predetermined voltage level.

The present invention also provides another DC—DC converter including the following: an inductive element with one terminal connected to a voltage input terminal via a first switching element and connected to a reference potential via a second switching element and with the other terminal connected to a voltage output terminal via a third switching element and connected to the reference potential via a fourth switching element; a feedforward control circuit, which outputs a first control signal used for turning on and off the third and fourth switching elements periodically corresponding to the input voltage applied to the voltage input terminal and outputs the first control signal that keeps the third switching element in the on state and the fourth switching element in the off state when the input voltage drops below a predetermined reference value; and a feedback control circuit, which outputs a second control signal used for turning on and off the first and second switching elements periodically corresponding to the voltage output from the voltage output terminal and outputs the second control signal that controls the ratio of the on time of the first switching element so that the output voltage is kept at a predetermined voltage level.

In the present invention preferably, the first and second control signals are asynchronous pulse signals in the period when the first and second switch elements as well as the third and fourth switching elements are turned on/off periodically.

BRIEF DESCRIPTION OF THE DRAWINGS

FIG. 6 is a circuit diagram illustrating an configuration example of the DC—DC converter disclosed in the first embodiment of the present invention.

FIG. 7 is a diagram illustrating the relationship between the ratio of the on times of the switching elements that constitute the H bridge of the DC—DC converter and the input voltage.

FIG. 8 is a diagram illustrating the waveforms when the DC—DC converter conducts a voltage increasing operation.

FIG. 9 is a diagram illustrating the waveforms when the DC—DC converter conducts a voltage increasing/decreasing operation.

FIG. 10 is a circuit diagram illustrating the second embodiment of the DC—DC converter disclosed in the present invention.

DESCRIPTION OF THE EMBODIMENTS

Figure 1:
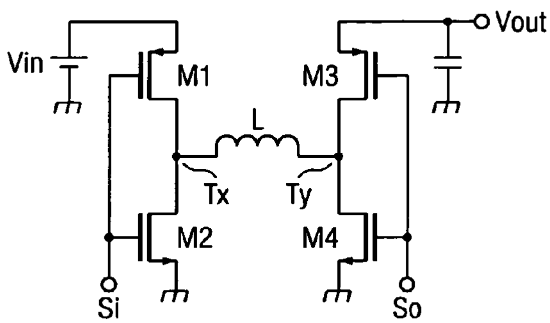
FIG. 1 is a diagram illustrating the basic configuration of the DC—DC converter disclosed in the present invention.

FIG. 1 is a circuit diagram illustrating the basic configuration of the DC—DC converter disclosed in the present invention.

As shown in the figure, the DC—DC converter of the present invention has the configuration of a so-called H bridge type switching regulator. The H bridge type switching regulator, as shown in the figure, includes an inductive element L (referred to as inductor L hereinafter) and four switching elements connected to the two terminals of inductor L. The switching elements, for example, comprise MOS transistors. They can also comprise bipolar transistors instead of MOS transistors.

In the example shown in FIG. 1, switching elements M1 and M3 comprise PMOS transistors, while switching elements M2 and M4 comprise NMOS transistors. As shown in the figure, switching element M1 is connected between the supply side of power supply voltage $V_{in}$ and one terminal $T_x$ of inductor L. Switching element M2 is connected between the terminal $T_x$ of inductor L and ground potential.

Switching elements M3 and M4 are connected to the other terminal $T_y$ of inductor L. As shown in the figure, switching element M3 is connected between the terminal $T_y$ of inductor L and the voltage output terminal, while switching element M4 is connected between the terminal $T_y$ of inductor L and ground potential.

Switching elements M1–M4 are controlled by control signals $S_i$ and S0 supplied from a control circuit that is not shown in the figure.

The power supply voltage Vin supplied to the DC—DC converter of the present invention is a power supply voltage that varies over a certain range, such as the output voltage of a chargeable secondary storage battery. If the secondary storage battery is a lithium ion battery, the output voltage can reach 4.2 V when the battery is fully charged. As power is supplied to the load, the output voltage will drop to, for example, 3.0 V.

In order to output a constant voltage Vout, for example, 3.3 V from the power supply voltage Vin that varies in a certain range, it is necessary to use a DC—DC converter that can both increase and decrease the voltage.

Figure 2:
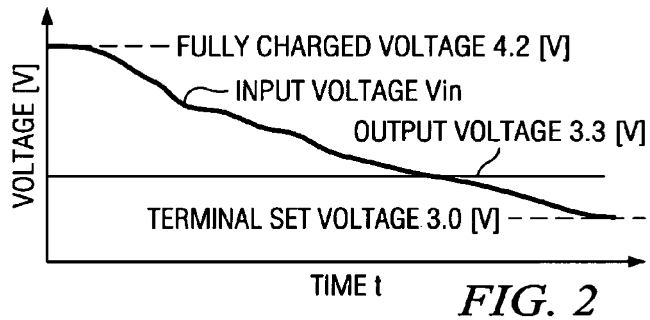
FIG. 2 is a diagram illustrating the levels of input voltage and output voltage.

FIG. 2 shows the change in power supply voltage Vin supplied by the battery. As shown in the figure, since the output voltage Vout is lower than the supplied power supply voltage Vin during the period when the supply voltage of the battery drops to 3.3 V from the fully charged state, the DC—DC converter must operate in voltage decrease mode. On the other hand, when the supply voltage of the battery becomes lower than 3.3 V, since output voltage Vout becomes higher than the power supply voltage Vin, the DC—DC converter must operate in voltage increase mode.

In the following, the switching control during voltage decrease and voltage increase of the DC—DC converter disclosed in the present invention will be explained with reference to FIG. 1.

First, in the case of the voltage decrease operation, by keeping control signal S0 at the low level, transistor M3 can be kept on, while transistor M4 can be kept off. Then, the output voltage Vout or its divided voltage is compared with a desired reference voltage, and the switching of transistors M1 and M2 is controlled corresponding to the comparison result. If the period of switching transistors M1 and M2 is taken as Ti and the on time of transistor M1 during period Ti is taken as ton1, the ratio Di of the time that transistor M1 is on is calculated as Di=ton1/Ti. At steady state, the following equation is valid.

Mathematical equation 1

$$Vout=Vin\cdot Di \tag{1}$$

Since Di is limited to the range of 0–1, the switching regulator can conduct the voltage decrease operation so that output voltage Vout does not exceed input voltage Vin.

In the case of voltage decrease operation, by keeping control signal Si at the low level, transistor M1 is kept on, while transistor M2 is kept off. Then, transistors M3 and M4 are controlled according to output voltage Vout or input voltage Vin.

If the period of switching transistors M3 and M4 is taken as To and the on time of transistor M3 during period To is taken as ton3, the ratio D0 of the time that transistor M3 is on is calculated as D0=ton3/To. At steady state, the following equation is valid.

Mathematical equation 2

$$Vin=Vout\cdot D0 \tag{2}$$

Since D0 is limited to the range of 0–1, input voltage Vin is increased without exceeding output voltage Vout. That is, the switching regulator conducts a voltage increase operation.

It is also possible to conduct a voltage increase/decrease operation by controlling both Di and D0. In this case, the following equation becomes valid at steady state.

Mathematical equation 3

$$Vin\cdot Di=Vout\cdot D0 \tag{3}$$

Compared with the case in which voltage increase/voltage decrease are conducted separately, in the case when the four switching elements M1–M4 are controlled to conduct the voltage increasing/decreasing operation, the switching losses increase. Therefore, it is preferred to conduct the control operation so that voltage decrease/voltage increases are performed separately.

Figure 3:
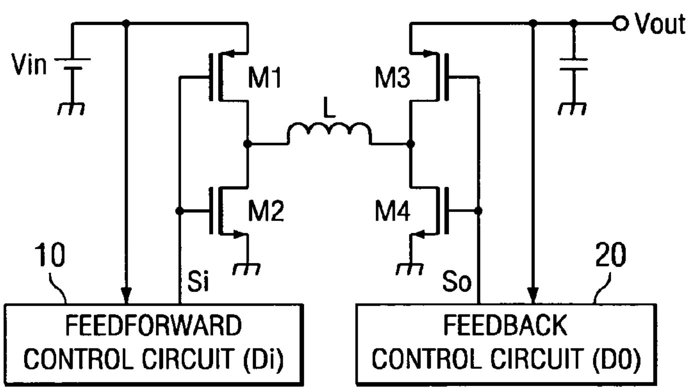
FIG. 3 is a block diagram illustrating an configuration example of the DC—DC converter disclosed in the present invention.
Figure 4:
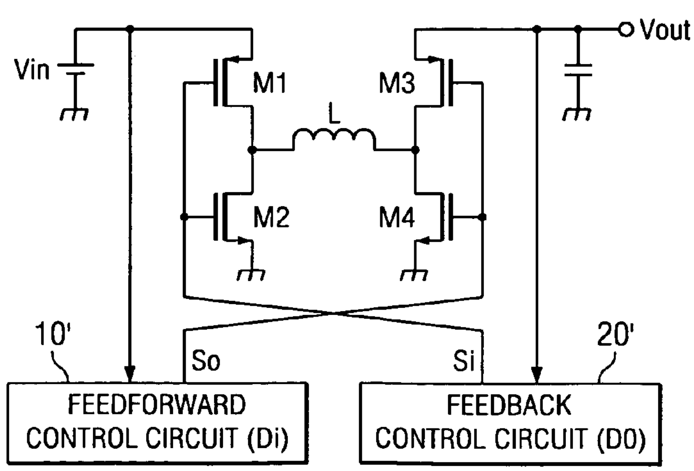
FIG. 4 is a block diagram illustrating another configuration example of the DC—DC converter disclosed in the present invention.

FIGS. 3 and 4 are block diagrams explaining the feedback and feedforward control in the DC—DC converter of the present invention.

The DC—DC converter shown in FIG. 3 is a circuit that switches the voltage increasing operation and the voltage decreasing operation to output a constant output voltage Vout.

In the block diagram shown in FIG. 3, feedforward control circuit (10) generates a control signal Si that controls the ratio Di of the time that transistor M1 is on corresponding to the input voltage Vin. Transistors M1 and M2 can be turned on or off corresponding to control signal Si.

In the following explanation, control signal Si used for controlling transistors M1 and M2 and control signal S0 used for controlling transistors M3 and M4 are called duty control signals.

Feedback control circuit (20) generates duty control signal S0 that controls ratio D0 of the time that transistor M3 is on corresponding to output voltage Vout. Transistors M3 and M4 are turned on or off corresponding to duty control signal S0.

The DC—DC converter shown in FIG. 4 is a circuit that switches the voltage decreasing operation and the voltage increasing operation to supply a constant output voltage Vout.

The difference between the configuration shown in FIG. 4 and the configuration shown in FIG. 3 is that feedback control circuit (20') outputs duty control signal Si that controls transistors M1 and M2, and feedforward control circuit (10') outputs duty control signal S0 that controls transistors M3 and M4.

As shown in FIG. 4, feedback control circuit (20') outputs duty control signal Si, which controls the ratio Di of the time that transistor M1 is on corresponding to the output voltage Vout, to control transistors M1 and M2.

On the other hand, feedforward circuit (10') outputs duty control signal S0, which controls the ratio D0 of the time that transistor M3 is on corresponding to the input voltage Vin, to control transistors M3 and M4.

As described above, the DC—DC converter of the present invention monitors both input voltage Vin and output voltage Vout and switches switching elements M1–M4 corresponding to the monitoring results. In this way, an almost stable voltage Vout can be supplied to the load irrespective of the change in input voltage Vin.

In the following, specific circuit examples will be used to explain the embodiment of the DC—DC converter disclosed in the present invention.

Figure 5:
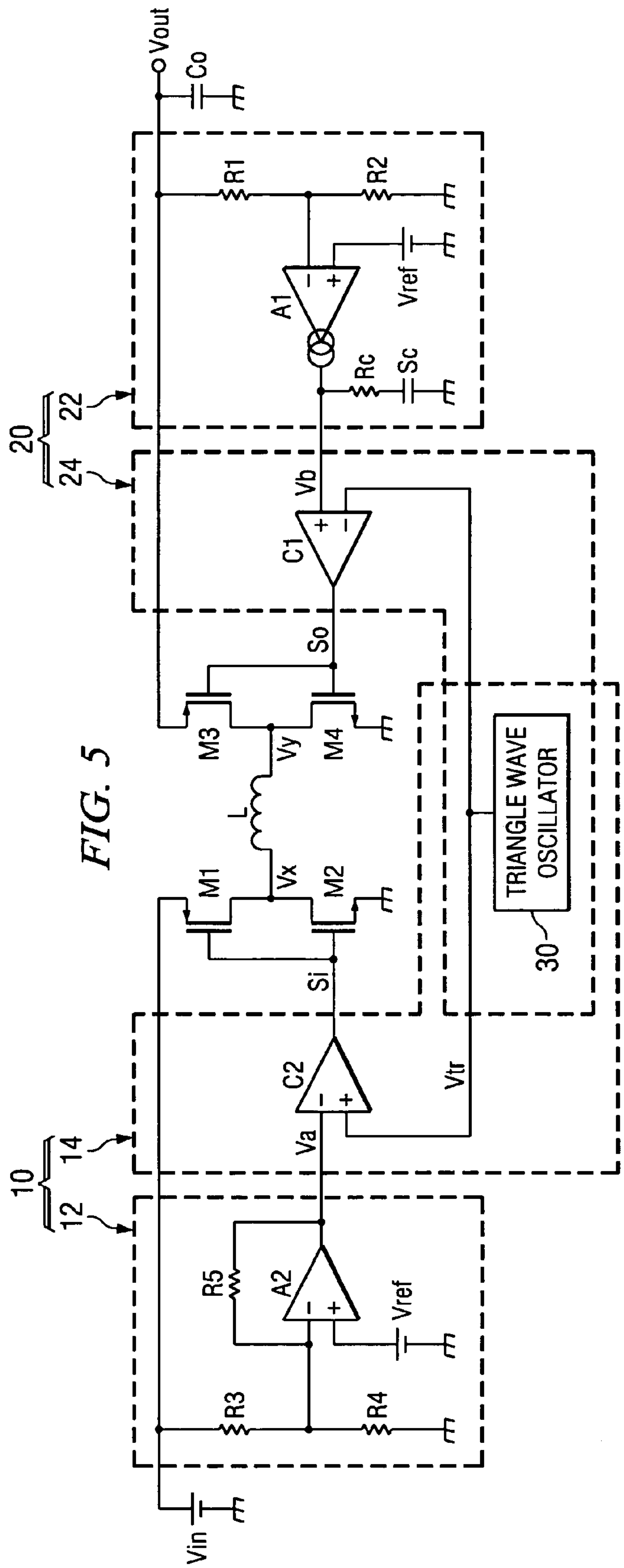
FIG. 5 is a circuit diagram illustrating the first embodiment of the DC—DC converter disclosed in the present invention.

FIG. 5 is a circuit diagram illustrating the DC—DC converter disclosed in the present invention.

As shown in the figure, the DC—DC converter disclosed in this embodiment is comprised of an H bridge comprising PMOS transistors M1, M3, NMOS transistors M2, M4, and inductor L, an input voltage monitoring circuit (12), feedforward pulse-width modulating circuit (14), error signal detection circuit (22), feedback pulse-width modulating circuit (24), and capacitor Co used for smoothing output voltage Vout.

The circuit comprises of input voltage monitoring circuit (12) and feedforward pulse-width modulating circuit (14) corresponds to feedforward control circuit (10) shown in FIG. 3. The circuit comprised of error signal detection circuit (22) and feedback pulse-width modulating circuit (24) corresponds to feedback control circuit (20) shown in FIG. 3.

Feedforward control circuit (10) generates duty control signal Si and supplies it to the gates of transistors M1 and M2. Feedback control circuit (20) generates duty control signal S0 and supplies it to the gates of transistors M3 and M4.

In feedforward control circuit (10), input voltage monitoring circuit (12) is comprised of resistors R3 and R4 that divide input voltage Vin, a constant voltage source that supplies reference voltage Vref, resistor R5, and operational amplifier (referred to as op amp hereinafter) A2.

Input voltage Vin, and DC voltage Va corresponding to reference voltage Vref and the voltage division ratio determined by the resistance of resistors R3 and R4 are output at input voltage monitoring circuit (12).

As shown in FIG. 5, feedforward pulse-width modulating circuit (14) is comprised of triangle wave oscillator (30) and comparator C2.

Comparator C2 compares the DC voltage Va output from input voltage monitoring circuit (12) and the triangle wave Vtr output from triangle wave oscillator (30) and outputs duty control signal Si.

Triangle wave Vtr is input to the positive input terminal (+) of comparator C2, and DC voltage Va is input to the negative input terminal (−). Therefore, if the level of triangle wave Vtr is higher than DC voltage Va, a duty control signal Si with a high level is output from comparator C2. On the other hand, if the level of triangle wave Vtr is lower than DC voltage Va, a duty control signal Si with a low level is output from comparator C2.

In other words, duty control signal Si with the pulse width modulated corresponding to input voltage Vin is generated by feedforward pulse-width modulating circuit (14).

Since duty control signal Si is input to the gates of transistors M1 and M2, when duty control signal Si is at a high level, transistor M1 is turned off, while transistor M2 is turned on. On the other hand, when duty control signal Si is at a low level, transistor M1 is turned on, while transistor M2 is turned off.

As described above, duty control signal Si with the pulse width modulated corresponding to input voltage Vin is generated by feedforward control circuit (10), and transistors M1 and M2 are controlled corresponding to the duty control signal Si. In other words, the ratio Di of the time that transistor M1 is on is controlled according to input voltage Vin.

In feedback control circuit (20), error signal detection circuit (22) is comprised of resistors R1 and R2 that divide output voltage Vout, a constant voltage source that supplies reference voltage Vref, current output type amplifier A1, resistor Rc, capacitor Cc.

Current output type amplifier A1 is a so-called gm amplifier with the output current value controlled corresponding to the input voltage. In the DC—DC converter disclosed in this aspect, it is also possible to use a regular voltage output type operational amplifier instead of the gm amplifier in error signal detection circuit (22).

A filter formed by connecting resistor Rc and capacitor Cc in series is set on the output side of gm amplifier A1. The filter reduces the ripple component in output voltage Vout in order to output stabilized voltage Vb and correct the phase shift occurring in the feedback loop.

Output voltage Vout, and DC voltage Vb corresponding to reference voltage Vref and the voltage division ratio determined by the resistance of resistors R1 and R2 are output at error signal detection circuit (22).

As shown in FIG. 5, feedback pulse-width modulating circuit (24) is comprised of triangle wave oscillator (30) and comparator C1. In other words, feedback pulse-width modulating circuit (24) and feedforward pulse-width modulating circuit (14) share triangle wave oscillator (30). However, the triangle wave Vtr supplied to comparators C1 and C2 is input to the input terminals with different polarities.

Triangle wave Vtr is input to the negative input terminal (−) of comparator C1, and DC voltage Vb is input to the positive input terminal (+). Therefore, if the level of triangle wave Vtr is lower than DC voltage Vb, a duty control signal S0 with a high level is output from comparator C1. On the other hand, if the level of triangle wave Vtr is higher than DC voltage Vb, a duty control signal S0 with a low level is output from comparator C1.

As described above, comparator C1 compares the DC voltage Vb output by error signal detection circuit (22) and the triangle wave Vtr output by triangle wave oscillator (30) and outputs duty control signal S0 with the pulse width modulated corresponding to the output voltage Vout.

Since duty control signal S0 is input to the gates of transistors M3 and M4, if duty control signal S0 is at the high level, transistor M3 is turned off, while transistor M4 is turned on. On the other hand, if duty control signal S0 is at the low level, transistor M3 is turned on, while transistor M4 is turned off.

As described above, duty control signal S0 with the pulse width modulated corresponding to output voltage Vout is generated by feedback control circuit (20), and transistors M3 and M4 are controlled corresponding to this duty control signal S0. In other words, the ratio D0 of the time that transistor M3 is on is controlled according to output voltage Vout.

In the DC—DC converter, feedback control circuit (20) monitors output voltage Vout and controls duty control signal S0 applied to the gates of transistors M3 and M4 so that the output voltage Vout is the desired value. On the other hand, feedforward control circuit (10) monitors input voltage Vin and conducts control in such a way that the ratio D0 of the time that transistor M3 is on, which is controlled by duty control signal S0 output from feedback control circuit (20), has the appropriate value.

More specifically, if input voltage Vin is lower than the desired output voltage Vout and it is necessary to conduct a voltage increase operation, duty control signal Si is controlled such that transistor M1 is kept on. On the other hand, if input voltage Vin minus output voltage Vout is small or positive, duty control signal Si is controlled appropriately to control the ratio Di of the time that transistor M1 is on such that the ratio D0 of the time that transistor M3 is on is in the range of 0–1, that is, $0<D0<1$.

Also, in the DC—DC converter, when a voltage increase/decrease operation is performed, duty control signals Si and S0 have opposite phase. This is because the triangle wave Vtr is input to the positive input terminal of comparator C2 in feedforward pulse-width modulating circuit (14), and triangle wave Vtr is input to the negative input terminal of comparator C1 in feedback pulse-width modulating circuit (24). When duty control signals Si and S0 are controlled to have opposite phase as described above, for example, even if input voltage Vin and output Vout are almost equal to each other and Di and D0 become almost the same, the transition characteristic of the DC—DC converter can be prevented from deteriorating.

In the present invention, in addition to having opposite phase, duty control signals Si and S0 may also have a phase difference. If duty control signals Si and S0 are in phase, when input voltage Vin and output voltage Vout are close to each other, the response characteristic of the DC—DC converter will deteriorate. In order to avoid this problem, it is preferred to introduce an appropriate phase difference between duty control signals Si and S0.

In the following, a detailed circuit example will be explained for the DC—DC converter disclosed.

FIG. 6 shows examples of the parameters of the resistors used for voltage division, reference voltage, etc. with respect to the DC—DC converter shown in FIG. 5.

As shown in the figure, input voltage Vin drops as power is supplied to the load side. This voltage is in the range of 1–4 V. For example, when input voltage Vin is supplied by a rechargeable battery, the input voltage Vin is high, for example, 4 V when the battery is fully charged. The output voltage of the battery drops to, for example, 1 V along with the supply of the power.

The output voltage Vout is 3 V. In other words, the DC—DC converter of this example is a circuit used for supplying an output voltage Vout of 3 V from the input voltage Vin that varies in the range of 1–4 V.

In input voltage monitoring circuit (12) the resistance values of resistors R3 and R4 that divide input voltage Vin are 16 R and 1.92 R, respectively. Also the resistance value of resistor R5 connected between the inverting input terminal and output terminal of op amp A2 is 3 R. Here, R can be any value.

In error signal detection circuit (22), the resistance values of resistors R1 and R2 that divide output voltage Vout are 4R' and R', respectively. Here, R' can be any value. Also, the reference voltages Vref of input voltage monitoring circuit (12) and error signal detection circuit (22) are both 0.6 V.

The amplitude of triangle wave Vtr output by triangle wave oscillator (30) is, for example, in the range of 0.6–1.2 V.

In the DC—DC converter of this example having the configuration, feedback control circuit (20) has almost the same configuration as that used in a conventional voltage increasing circuit. It compares the voltage obtained by dividing output voltage Vout to ⅕ and the reference voltage Vref of 0.6 V and outputs duty control signal S0 such that output voltage Vout is kept at the desired level of 3 V.

In feedforward control circuit (10), a duty control signal Si with modulated pulse width is generated by comparing triangle wave Vtr with DC voltage Va obtained from the divided voltage of input voltage Vin and reference voltage Vref.

In this circuit, when input voltage Vin drops below 2.4 V, the output voltage Va of op amp A2 becomes higher than 1.2 V. Since the maximum amplitude of triangle wave Vtr becomes 1.2 V, when input voltage Vin drops below 2.4 V, the duty control signal Si output from comparator C2 is fixed at the low level. Consequently, transistor M1 is fixed in the on state. That is, Di=1.

When input voltage Vin becomes higher than 2.4 V, the output voltage Va of op amp A2 drops below 1.2 V. At that time, the pulse width of the duty control signal Si output from comparator C2 is modulated by input voltage Vin to keep Di in the range of 0–1. At that time, Di and D0 are given by the following equations according to the circuit parameters shown in FIG. 6 and equation (3).

Mathematical equation 4

$$Di=1.75-Vin/3.2 \tag{4}$$

Mathematical equation 5

$$D0=(1.75-Vin/3.2)VinNout \tag{5}$$

FIG. 7 is a diagram illustrating Di and D0 plotted with respect to input voltage Vin according to equations (4) and (5).

As shown in FIG. 7, when input voltage Vin is in the range of 1–2.4 V, Di is fixed at 1, while D0 varies linearly with respect to Vin. When the input voltage Vin is in the range of 2.4—4 V, as shown in equation (4), Di becomes a linear function of input voltage Vin. At that time, as shown in equation (5), D0 becomes a quadratic function of input voltage Vin.

FIGS. 8 and 9 are waveform diagrams illustrating the terminal voltages Vx, Vy and current $I_L$ of inductor L in the DC—DC converter of the present embodiment shown in FIG. 5 or 6. In the following, the operation of the DC—DC converter of the present embodiment will be explained with reference to FIGS. 8 and 9.

In FIGS. 8 and 9, the maximum value of input voltage Vin is 4.0 V, and the desired output voltage Vout is 3.0 V.

FIG. 8 shows the waveforms of terminal voltages Vx, Vy and current $I_L$ of inductor L when input voltage Vin is 1.5 V and the output voltage Vout is 3.0 V. FIG. 9 shows the waveforms of terminal voltages Vx, Vy and current $I_L$ of inductor L when input voltage Vin is 4.0 V and the output voltage Vout is 3.0 V.

In the DC—DC converter shown in FIG. 6, when input voltage Vin drops below 2.4 V, Di is fixed to 1, and the DC—DC converter conducts a voltage increasing operation. When input voltage Vin exceeds 2.4 V, the DC—DC converter conducts a voltage increasing/decreasing operation.

In FIG. 8, since input voltage Vin is 1.5 V, the DC—DC converter conducts a voltage increasing operation. At that time, transistor M1 is fixed in the on state, while transistor M2 is fixed in the off state. Transistors M3 and M4 are controlled by duty control signal S0 with its pulse width modulated corresponding to output voltage Vout. At that time, the ratio D0 of the time that transistor M3 is on is controlled appropriately so that output voltage Vout is kept at the desired level of 3 V. As shown in FIG. 7, when the input voltage Vin is 1.5 V, Di becomes 1, and D0 becomes almost 0.5.

As shown in FIG. 8(*a*), the voltage Vx at one terminal of inductor L is kept at input voltage Vin. As shown in FIG. 8(*b*), the voltage Vy at the other terminal of inductor L is kept at output voltage Vout or ground potential according to the on/off state of transistor M3. As shown in FIG. 8(*c*), current $I_L$ is determined corresponding to the voltage difference between the two terminals of inductor L.

During the period when the voltage Vx at the input terminal of inductor L is kept at input voltage Vin and the voltage Vy at the output terminal of inductor L is kept at output voltage Vout, the voltage Vx at the input terminal of inductor L is lower than the voltage Vy at the output terminal, and current $I_L$ of inductor L is reduced. On the other hand, when the voltage Vy at the output terminal of inductor L is kept at ground potential, the potential difference between the two terminals of inductor L is equal to input voltage Vin. As a result, magnetic energy is stored in inductor L by input voltage Vin, and current IL increases.

In the DC—DC converter shown in FIG. 6, when input voltage Vin is 1.5 V, feedforward control circuit (10) and feedback control circuit (20) conduct control appropriately so that Di becomes 1 and D0 becomes almost 0.5. In this way, the DC—DC converter performs a voltage increasing operation to keep the output voltage Vout at the desired level of 3 V.

In the following, the operation of the DC—DC converter when input voltage Vin is 4 V will be explained. When input voltage Vin is 4 V, the DC—DC converter conducts a voltage increasing/decreasing operation. FIG. 9 shows the waveforms of terminal voltages Vx, Vy and current $I_L$ of inductor L at that time.

As shown in FIG. 7, when input voltage Vin is 4 V, Di becomes 0.5, and D0 becomes about 0.66.

As shown in FIG. 9(*a*), the voltage Vx at one terminal of inductor L alternates between the input voltage Vin and ground potential. The ratio of the time that terminal voltage Vx is at input voltage Vin is about 0.5.

As shown in FIG. 9(*b*), the voltage Vy at the other terminal of inductor L alternates between the output voltage Vout and ground potential. The ratio of the time that terminal voltage Vy is at input voltage Vout is about 0.66.

As described above, in the DC—DC converter shown in FIG. 6, when input voltage Vin is 4 V, feedforward control circuit (10) and feedback control circuit (20) execute suitable control so that Di is 0.5 and D0 is almost 0.66. In this way, the DC—DC converter performs a voltage increasing/decreasing operation to keep the output voltage Vout at the desired level of 3 V.

As explained above, by using the DC—DC converter disclosed in this embodiment, when input voltage Vin varies over a certain range, feedforward control is conducted corresponding to input voltage Vin to control the ratio Di of the period for applying input voltage Vin to inductor L. Also, feedback control is conducted corresponding to output voltage Vout to control the ratio D0 of the period for outputting the current from inductor L to the load. In this way, the DC—DC converter can switch the voltage increase or voltage decrease operation appropriately according to input voltage Vin to keep the output voltage Vout on the desired level.

FIG. 10 is a circuit diagram illustrating another aspect of the DC—DC converter disclosed in the present invention.

As shown in the figure, the DC—DC converter disclosed in this aspect has almost the same configuration as shown in FIG. 5. However, in the DC—DC converter of the present embodiment, input voltage monitoring circuit (12*a*) is different from the corresponding part in the first embodiment.

As shown in the figure, in this embodiment, input voltage monitoring circuit (12*a*) includes voltage dividing resistors R3 and R4 used for dividing input voltage Vin, a constant voltage source that supplies reference voltage Vref, and resistor R5 used for adding reference voltage Vref to the divided voltage.

By using input voltage monitoring circuit (12*a*) with the configuration, a DC voltage Va is generated corresponding to input voltage Vin, reference voltage Vref, and the resistance values of voltage dividing resistors R3 and R4.

The DC voltage Va generated by input voltage monitoring circuit (12*a*) is output to feedforward pulse-width modulating circuit (14*a*). In feedforward pulse-width modulating circuit (14*a*), DC voltage Va is compared with triangle wave Vtr generated by triangle wave oscillator (30), and duty control signal Si is output corresponding to the comparison result. The ratio Di of the time that transistor M1 is on is controlled corresponding to duty control signal Si.

Also, in feedforward pulse-width modulating circuit (14*a*) and feedback pulse-width modulating circuit (24*a*), the polarities of the input terminals of comparator C1 or C2 for triangle wave Vtr and comparison signal (DC voltage) Va or Vb are different from those shown in FIG. 5. As shown in FIG. 10, in feedforward pulse-width modulating circuit (14*a*), the comparison signal Va from input voltage monitoring circuit (12*a*) is input to the positive input terminal of comparator C1, and triangle wave Vtr is input to the negative input terminal.

This is because input voltage monitoring circuit (12*a*) outputs a comparison signal Va that varies in the same direction as input voltage Vin.

The comparison signal Va output by input voltage monitoring circuit (12*a*) rises when input voltage Vin rises. On the other hand, this voltage droops when input voltage Vin drops. In other words, comparison signal Va varies in the same direction as input voltage Vin.

Consequently, when input voltage Vin drops below a prescribed or predetermined voltage, in feedforward pulse-width modulating circuit (14*a*), for example, the level of comparison signal Va is lower than triangle wave Vtr, and duty control signal Si output from comparator C2 is kept at the low level. In this way, transistor M1 remains on, and the DC—DC converter conducts a voltage increasing operation.

When input voltage Vin is higher than the prescribed voltage, duty control signal Si whose pulse width is modulated corresponding to input voltage Vin is output from feedforward pulse-width modulating circuit (14*a*). The ratio Di of the time that transistor M1 is on is controlled correspondingly. As a result, an appropriate duty control signal S0 is generated by feedback pulse-width modulating circuit (24*a*) so that output voltage Vout is kept at the desired level. In this case, the DC—DC converter conducts a voltage increasing/decreasing operation to provide the desired output voltage Vout to the load.

In the DC—DC converter disclosed in this embodiment, since the polarities of the input terminals for triangle wave Vtr of converters C1 and C2 are opposite to each other, the duty control signals Si and S0 with modulated pulse width and output from feedforward pulse-width modulating circuit (14*a*) and feedback pulse-width modulating circuit (24*a*) have opposite phase. Therefore, even if input voltage Vin and output voltage Vout are almost equal to each other and Di and D0 are almost the same, deterioration in the transition characteristic of the DC—DC converter can be avoided.

As described above, in the DC—DC converter disclosed in this aspect, input voltage monitoring circuit (12*a*) that divides input voltage Vin and generates a DC voltage Va for comparison is comprised of voltage dividing resistors R3, R4, a constant voltage source that supplies reference voltage Vref, and resistor R5. Consequently, compared with the input voltage monitoring circuit (12) used in the first embodiment, there is no need to use op amp A2, and the configuration of the circuit can be simplified.

Figure 11:
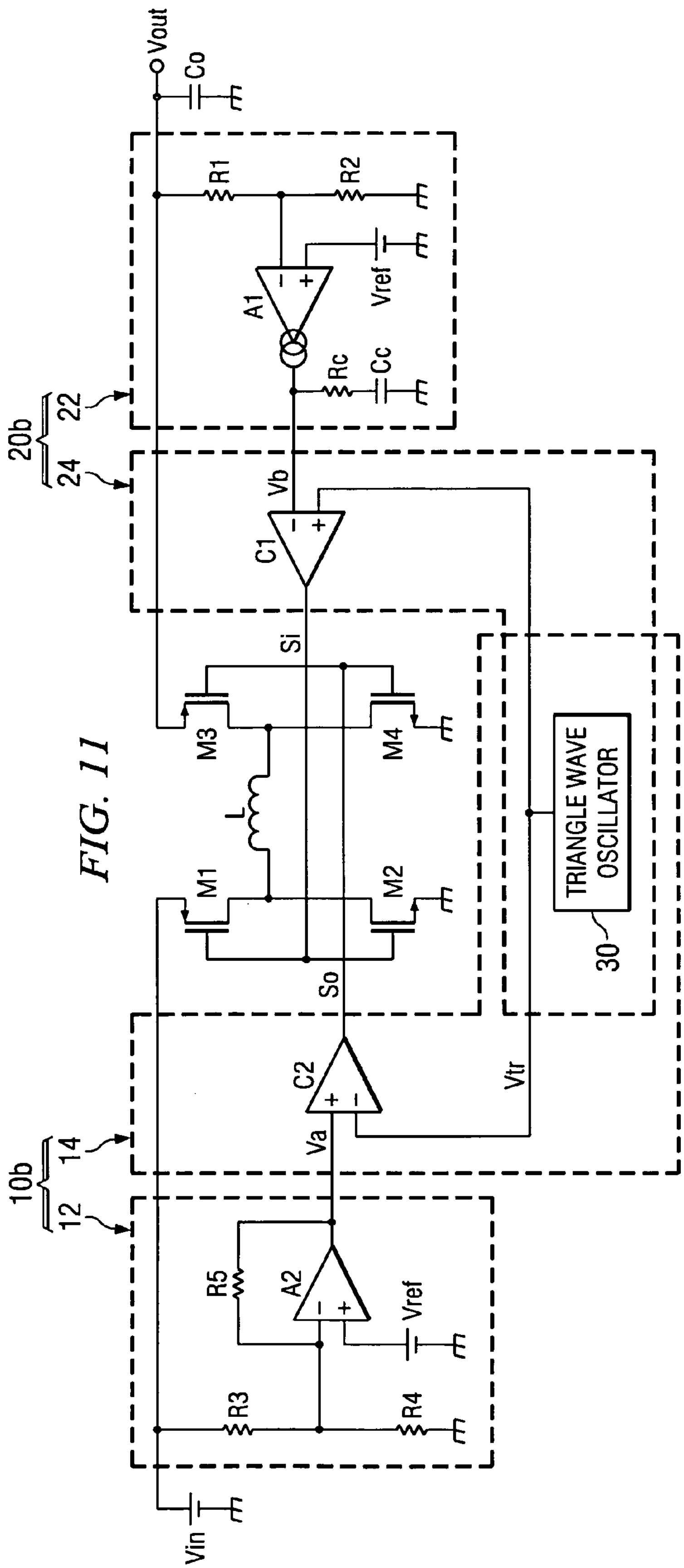
FIG. 11 is a circuit diagram illustrating the third embodiment of the DC—DC converter disclosed in the present invention.

FIG. 11 is a circuit diagram illustrating yet another aspect of the DC—DC converter disclosed in the present invention.

As shown in FIG. 11, in the DC—DC converter, input voltage monitoring circuit (12) and feedforward pulse-width modulating circuit (14) that constitute feedforward control circuit (10*b*) have the same configuration as the corresponding circuit in the first embodiment of the present invention shown in FIG. 5. Error signal detection circuit (22) and feedback pulse-width modulating circuit (24) that constitutes feedback control circuit (20*b*) also have the same configuration as the corresponding circuit in the first embodiment of the present invention shown in FIG. 5.

In the DC—DC converter disclosed in this embodiment, however, duty control signal S0 that controls transistors M3 and M4 is output by feedforward control circuit (10*b*), while duty control signal Si that controls transistors M1 and M2 is output by feedback control circuit (20*b*). This is different from the first embodiment shown in FIG. 5.

In other words, the DC—DC converter disclosed in this embodiment is an example that embodies the DC—DC converter of the present invention shown in FIG. 4. Feedforward control circuit (10*b*) corresponds to the feedforward control circuit (10') shown in FIG. 4, and feedback control circuit (20*b*) corresponds to the feedback control circuit (20') shown in FIG. 4.

In the DC—DC converter with the configuration shown in FIG. 11, duty control signal S0 is generated by feedforward control circuit (10*b*), and said duty control signal S0 is applied to the gates of transistors M3 and M4. Also, duty control signal Si is generated by feedback control circuit (20*b*), and said duty control signal Si is applied to the gates of transistors M1 and M2.

In the DC—DC converter with the disclosed configuration, feedforward control circuit (10*b*) monitors input voltage Vin and generates duty control signal S0 correspondingly to control transistors M3 and M4. On the other hand, feedback control circuit (20*b*) monitors output voltage Vout and generates duty control signal Si correspondingly to control transistors M1 and M2.

The DC—DC converter with the above configuration switches the voltage decreasing operation or the voltage increasing/decreasing operation according to input voltage Vin. In input voltage monitoring circuit (12), op amp A2 acts as an inverting amplifier. Therefore, when input voltage Vin goes above a prescribed voltage, the level of comparison voltage Va output from input voltage monitoring circuit (12) is below triangle wave Vtr, and duty control signal S0 output from comparator C2 is kept at the low level. Consequently, transistor M3 is fixed to the on state. In other words, D0 is held at 1. In this case, the DC—DC converter conducts a voltage decreasing operation. Duty control signal Si is output by feedback control circuit (20*b*) corresponding to output voltage Vout to control transistor M1 appropriately so that output voltage Vout is at the desired level.

On the other hand, when input voltage Vin goes below a prescribed voltage, the level of comparison voltage Va output from input voltage monitoring circuit (12) goes above a prescribed value. In this case, duty control signal S0 whose pulse width is modulated corresponding to input voltage Vin is output. In this way, the ratio of the on time of transistor M3 is controlled, and the DC—DC converter conducts a voltage increasing/decreasing operation. In this case, transistor M1 is controlled by duty control signal Si output from feedback control circuit (20*b*) so that output voltage Vout is at the desired level.

Also, in the DC—DC converter disclosed in this aspect, since the polarities of the input terminals for triangle wave Vtr of comparators C1 and C2 in feedforward pulse-width modulating circuit (14) and feedback pulse-width modulating circuit (24) are opposite as shown in FIG. 11, duty control signals S0 and Si have opposite phase. Consequently, when input voltage Vin and output voltage Vout are almost equal to each other and Di and D0 are almost the same, deterioration of the transition characteristic of the DC—DC converter can be avoided.

As explained above, according to this embodiment, output voltage Vout is monitored by feedback control circuit (20*b*), and duty control signal Si is output correspondingly to control the ratio Di of the on time of transistor M1. Also, the input voltage is monitored by feedforward control circuit (10*b*), and duty control signal S0 is output correspondingly to control the ratio D0 of the on time of transistor M3. When input voltage Vin is higher than a prescribed value, duty control signal S0 is controlled appropriately so that D0 becomes 1, and the DC—DC converter conducts a voltage decreasing operation. Otherwise, the DC—DC converter conducts a voltage increasing/decreasing operation. In this way, output voltage Vout can be controlled to stay at the desired level.

As explained above, by using the DC—DC converter of the present invention, the switching elements of an H bridge type switching regulator are controlled corresponding to the input and output voltages to conduct a voltage increasing operation or a voltage decreasing operation or a voltage increasing/decreasing operation. In this way, the desired output voltage can be supplied to the load with respect to the input voltage that varies over a certain range.

Also, according to the present invention, the response characteristic can be improved at the time that the input and output voltages are close to each other by varying the timing for supplying current from input voltage to the inductor and the timing for outputting current from the inductor to the load.

What is claimed is:

1. A DC—DC converter, comprising:

an inductive element with one terminal connected to a voltage input terminal via a first switching element and connected to a reference potential via a second switching element and with the other terminal connected to a voltage output terminal via a third switching element and connected to the reference potential via a fourth switching element, a feedforward control circuit, which outputs a first control signal used for turning on and off the first and second switching elements periodically corresponding to the input voltage applied to the voltage input terminal and outputs the first control signal that keeps the first switching element in the on state and the second switching element in the off state when the input voltage drops below a prescribed reference value, and a feedback control circuit, which outputs a second control signal used for turning on and off the third and fourth switching elements periodically corresponding to the voltage output from the voltage output terminal and outputs the second control signal that controls the ratio of the on time of the third switching element so that the output voltage is kept at a prescribed voltage level.

2. The DC—DC converter described in claim 1, wherein the feedforward control circuit has a first voltage generating circuit that generates a DC voltage by adding a prescribed reference voltage to the voltage obtained by dividing the input voltage at a prescribed voltage division ratio.

3. The DC—DC converter described in claim 2, wherein the feedforward control circuit has a first comparator, which compares the DC voltage output from the first voltage generating circuit with a triangle wave having a prescribed period and outputs the first control signal controlling the first and second switching elements corresponding to the comparison result.

4. The DC—DC converter described in claim 1, wherein the feedback control circuit has a second voltage generating circuit that generates a DC voltage by adding a prescribed reference voltage to the voltage obtained by dividing the output voltage at a prescribed voltage division ratio.

5. The DC—DC converter described in claim 4, wherein the feedback control circuit has a second comparator, which compares the DC voltage output from the second voltage generating circuit with a triangle wave having a prescribed period and outputs the second control signal controlling the third and fourth switching elements corresponding to the comparison result.

6. The DC—DC converter described in claim 1, wherein the first and second control signals are asynchronous pulse signals during the period when the first and second switch elements as well as the third and fourth switching elements are turned on/off periodically.

7. A DC—DC converter comprising:

an inductive element with one terminal connected to a voltage input terminal via a first switching element and connected to a reference potential via a second switching element and with the other terminal connected to a voltage output terminal via a third switching element and connected to the reference potential via a fourth switching element, a feedforward control circuit, which outputs a first control signal used for turning on and off the third and fourth switching elements periodically corresponding to the input voltage applied to the voltage input terminal and outputs the first control signal that keeps the third switching element in the on state and the fourth switching element in the off state when the input voltage drops below a prescribed reference value, and a feedback control circuit, which outputs a second control signal used for turning on and off the first and second switching elements periodically corresponding to the voltage output from the voltage output terminal and outputs the second control signal that controls the ratio of the on time of the first switching element so that the output voltage is kept at a prescribed voltage level.

8. The DC—DC converter described in claim 7, wherein the feedforward control circuit has a first voltage generating circuit that generates a DC voltage by adding a prescribed reference voltage to the voltage obtained by dividing the input voltage at a prescribed voltage division ratio.

9. The DC—DC converter described in claim 8, wherein the feedforward control circuit has a first comparator, which compares the DC voltage output from the first voltage generating circuit with a triangle wave having a prescribed period and outputs the first control signal controlling the third and fourth switching elements corresponding to the comparison result.

10. The DC—DC converter described in claim 7, wherein the feedback control circuit has a second voltage generating circuit that generates a DC voltage by adding a prescribed reference voltage to the voltage obtained by dividing the output voltage at a prescribed voltage division ratio.

11. The DC—DC converter described in claim 10, wherein the feedback control circuit has a second comparator, which compares the DC voltage output from the second voltage generating circuit with a triangle wave having a prescribed period and outputs the second control signal controlling the first and second switching elements corresponding to the comparison result.

12. The DC—DC converter described in claim 7, wherein the first and second control signals are asynchronous pulse signals during the period when the first and second switch elements as well as the third and fourth switching elements are turned on/off periodically.

* * * * *